T. B. YOUNG & S. A. DAVIS.
ADJUSTABLE GRADUATED MEASURES.

No. 170,216. Patented Nov. 23, 1875.

Witnesses.
A. Ruppert.

T. B. Young
S. A. Davis
Inventor.
D. P. Holloway & Co
Attys

UNITED STATES PATENT OFFICE.

THOMAS B. YOUNG AND SILAS A. DAVIS, OF LIVERMORE, KY., ASSIGNORS OF ONE-THIRD THEIR RIGHT TO JOHN A. MOORE, OF SAME PLACE.

IMPROVEMENT IN ADJUSTABLE GRADUATED MEASURES.

Specification forming part of Letters Patent No. 170,216, dated November 23, 1875; application filed May 22, 1875.

*To all whom it may concern:*

Be it known that we, THOMAS B. YOUNG and SILAS A. DAVIS, both of Livermore, in the county of McLean and State of Kentucky, have invented a certain Improvement in Measures, of which the following is a specification:

Our invention, intended more especially to improve the construction of dry-measures, consists in constructing such measures of two or more sections, telescopically connected, and provided with means for holding the sections in determined relative positions in such a manner that one vessel may serve for measuring various quantities.

Figure 1:
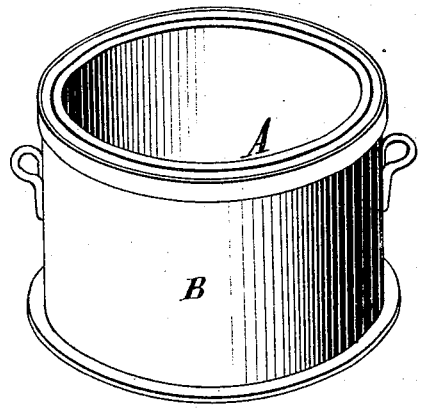
Figure 2:
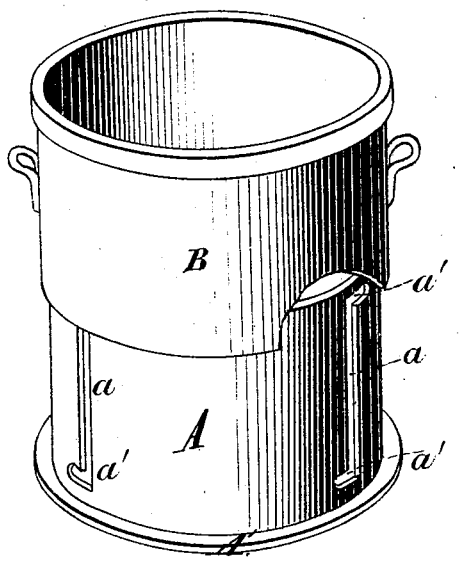
Figure 3:
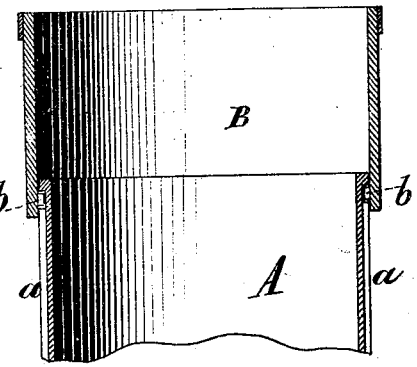

In the annexed drawings, Figure 1 is a perspective view of our improved measure shut up to its smallest capacity. Fig. 2 is also a perspective view thereof, showing it drawn out to its largest capacity. Fig. 3 is a section thereof.

The same letters of reference are used in all the figures in the designation of identical parts.

The measure illustrated consists of two sections, A and B, the upper one, B, of which is a simple tube encircling the lower one A, which is provided with a bottom, A'. When the sections are shut up, as shown in Fig. 1, the top of B will be flush with the top of A, and the measure thus reduced to the capacity of A. By drawing section B out to a greater or less extent the capacity of the measure will be correspondingly increased. One or more vertical grooves, $a$, are formed exteriorly on section A, provided with short lateral branches $a'$. A pin or pins, $b$, on section B fit these grooves, and by turning these pins into the branches $a'$ section B may be held at any desired point on section A. The laterals $a'$ will be so located as to give determined capacities to the measure as the pin $b$ enters one or the other. We have shown only two such laterals, but more may of course be provided, to enable the measure to gage more than two determined quantities.

Likewise more than two sections thus telescopically connected may be used to make up a variable measure.

We do not claim, broadly, a graduated measuring device, composed of telescopically-connected sections, as we are aware that similar contrivances have heretofore been used in powder and shot flasks. It is for applying this principle to the ordinary dry-measure, having a permanent bottom, that we ask this patent.

What we claim as our invention, and desire to secure by Letters Patent, is—

As a new article of manufacture, a graduated measure, composed of two or more telescopically-connected sections, the lower one of which has a permanent bottom, the sections being provided with interlocking laterally-branched grooves $a\ a'$ and pins $b$, all substantially as specified.

In testimony whereof we have signed our names to this specification in the presence of two subscribing witnesses.

THOMAS B. YOUNG.
SILAS A. DAVIS.

Witnesses:
W. R. RICHARDSON,
HARDIN M. TWEDDELL.